United States Patent
Zhang (10) Patent No.: US 11,362,771 B2
(45) Date of Patent: Jun. 14, 2022

(54) BASE STATION AND AUTOMATIC RETRANSMISSION SCHEDULING METHOD THEREOF

(71) Applicant: Sercomm Corporation, Taipei (TW)

(72) Inventor: Xujing Zhang, Jiangsu (CN)

(73) Assignee: Sercomm Corporation, Taipei (TW)

(*) Notice: Subject to any disclaimer, the term of this patent is extended or adjusted under 35 U.S.C. 154(b) by 295 days.

(21) Appl. No.: 16/852,543

(22) Filed: Apr. 20, 2020

(65) Prior Publication Data

US 2021/0021379 A1 Jan. 21, 2021

(30) Foreign Application Priority Data

Jul. 16, 2019 (CN) .......................... 201910639684.2

(51) Int. Cl.
*H04L 1/18* (2006.01)
*H04L 5/00* (2006.01)
*H04W 80/02* (2009.01)

(52) U.S. Cl.
CPC ............ *H04L 1/189* (2013.01); *H04L 1/1819* (2013.01); *H04L 1/1896* (2013.01); *H04L 5/0055* (2013.01); *H04W 80/02* (2013.01)

(58) Field of Classification Search
None
See application file for complete search history.

(56) References Cited

U.S. PATENT DOCUMENTS

| | | | |
|---|---|---|---|
| 2011/0051669 A1* | 3/2011 | Wang | H04L 47/624 370/328 |
| 2011/0134774 A1 | 6/2011 | Pelletier et al. | |
| 2012/0127904 A1* | 5/2012 | Tomizawa | H04W 52/0258 370/311 |
| 2014/0204918 A1* | 7/2014 | Ha | H04W 28/14 370/336 |

(Continued)

FOREIGN PATENT DOCUMENTS

CN 1711726 12/2005
CN 101127587 2/2008

(Continued)

OTHER PUBLICATIONS

Office Action of China Counterpart Application, dated Jul. 19, 2021, pp. 1-6.

*Primary Examiner* — Otis L Thompson, Jr.
(74) *Attorney, Agent, or Firm* — JCIPRNET (57) ABSTRACT

The invention provides a base station and an automatic retransmission scheduling method thereof. The automatic retransmission scheduling method includes the following steps: when at least one first layer of protocol data unit of a first protocol layer constitutes a second layer PDU of a second protocol layer, assigning a retransmission serial number of the second layer PDU according to a serial number of the first layer PDU; sending the second layer PDU to a user equipment; receiving a status report of a first retransmission mechanism of the first protocol layer, and an acknowledgement serial number indicates that receiving of multiple PDUs of the first protocol layer by the UE is (Continued)

acknowledged; comparing the retransmission serial number of the second layer PDU with the ACK serial number, and determining whether to disable retransmission of the second layer PDU based on a second retransmission mechanism.

16 Claims, 7 Drawing Sheets

(56) References Cited

U.S. PATENT DOCUMENTS

| | | |
|---|---|---|
| 2015/0016318 A1 | 1/2015 | Lee et al. |
| 2016/0157101 A1* | 6/2016 | Do .................. H04W 12/08 455/410 |
| 2016/0192376 A1 | 6/2016 | Lee et al. |
| 2016/0323762 A1 | 11/2016 | Adachi |
| 2016/0373233 A1 | 12/2016 | Pelletier et al. |
| 2018/0302821 A1 | 10/2018 | Gustafsson et al. |
| 2019/0028877 A1 | 1/2019 | Loehr et al. |
| 2019/0058550 A1* | 2/2019 | Kim .................. H04L 1/1628 |
| 2019/0058986 A1* | 2/2019 | Loehr ............... H04L 1/1825 |
| 2020/0036484 A1* | 1/2020 | Kim .................. H04L 1/1621 |

FOREIGN PATENT DOCUMENTS

| | | |
|---|---|---|
| CN | 101217350 | 7/2008 |
| CN | 101346925 | 1/2009 |
| CN | 101478380 | 7/2009 |
| CN | 101507319 | 8/2009 |
| CN | 102123520 | 7/2011 |
| CN | 102150452 | 8/2011 |
| CN | 101809923 | 11/2016 |
| CN | 106233697 | 12/2016 |
| CN | 107370575 | 11/2017 |
| CN | 107852289 | 3/2018 |
| CN | 107852672 | 3/2018 |
| EP | 1511214 | 3/2005 |
| WO | WO-2008153320 A1 * | 12/2008 ........... H04B 7/2603 |

* cited by examiner

BASE STATION AND AUTOMATIC RETRANSMISSION SCHEDULING METHOD THEREOF

CROSS-REFERENCE TO RELATED APPLICATION

This application claims the priority benefit of China application no. 201910639684.2, filed on Jul. 16, 2019. The entirety of the above-mentioned patent application is hereby incorporated by reference herein and made a part of this specification.

BACKGROUND OF THE INVENTION

1. Field of the Invention

The invention relates to an automatic retransmission technology, and in particular, to a base station (BS) and an automatic retransmission scheduling method thereof in a time division duplex (TDD) system.

2. Description of Related Art

There are two layers of retransmission mechanisms in a long term evolution (LTE) system: namely, an automatic repeat request (ARQ) at a radio link control (RLC) layer, and a hybrid automatic repeat request (HARQ) at a media access control (MAC) layer.

In a scenario in which the HARQ is applied to a TDD system, acknowledgement (ACK)/negative acknowledgement (NACK) feedback manners in a downlink HARQ process may include bundling and multiplexing. In both bundling and multiplexing, a quantity of to-be-transmitted ACKs/NACKs are compressed and bound and then allocated to the same uplink subframe for feedback. In addition, for a TDD system using a carrier aggregation (CA) technology, the quantity of ACKs/NACKs significantly increases due to simultaneous multicarrier transmission, but the foregoing HARQ bundling or HARQ multiplexing is not applicable due to the significant increase in the quantity of ACKs/NACKs. Based on the above, in the TDD system using the CA technology, a physical uplink control channel format 3 (PUCCH format 3) or a physical uplink control channel format 1b (PUCCH format 1b) for joint channel selection is introduced for HARQ ACK/NACK feedback, and a spatial bundling operation is performed to compress the quantity of HARQ ACKs/NACKs.

Figure 1:
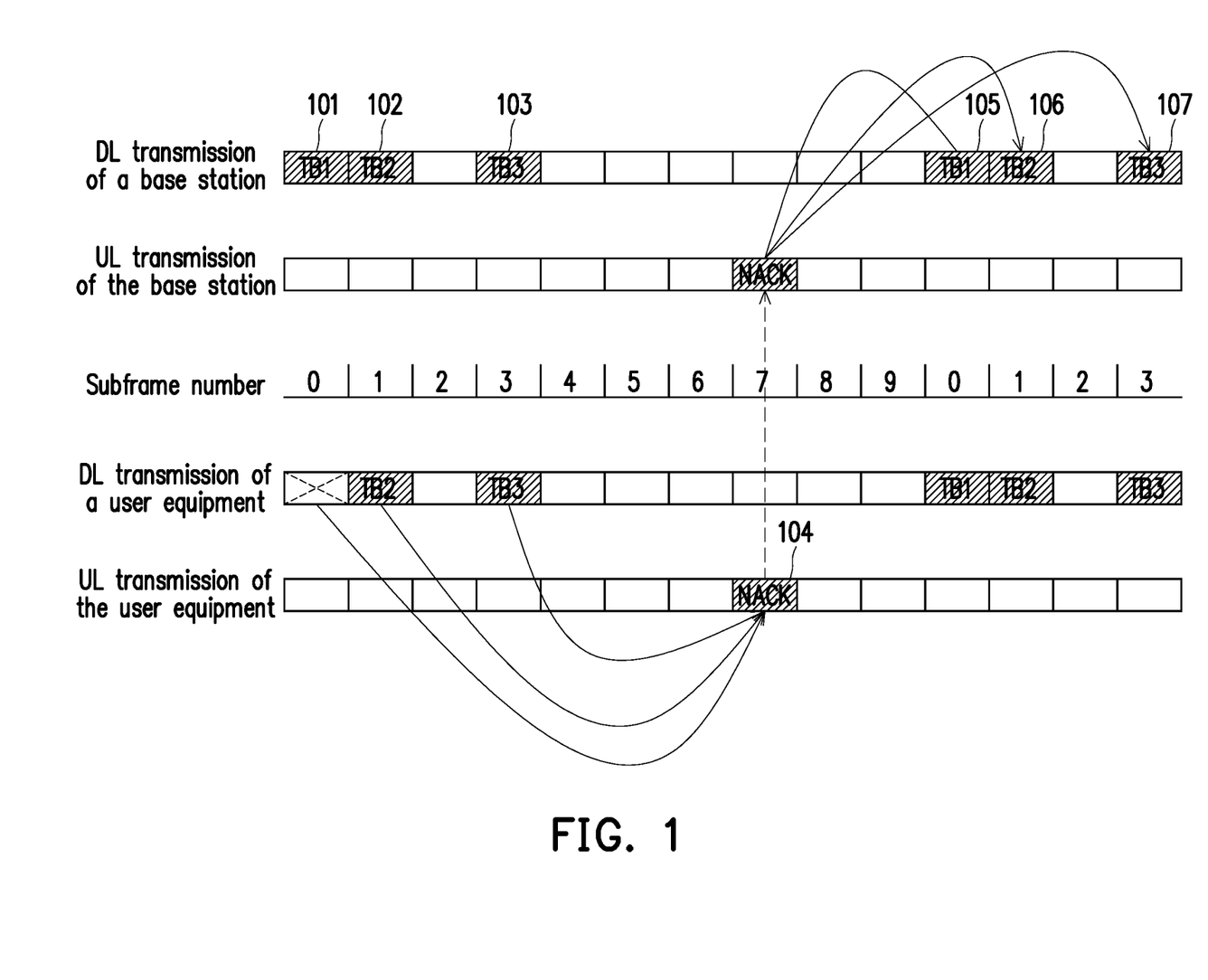
FIG. 1 is a schematic diagram of an automatic retransmission request using HARQ bundling.

In the TDD system, in the foregoing various HARQ ACK/NACK feedback manners, a plurality of actual ACKs/NACKs is compressed and bound into one ACK/NACK for feedback, and therefore there is a loss of true HARQ ACK/NACK information. Therefore, HARQ NACK feedback may cause unnecessary retransmission, resulting in a waste of radio resources. For example, FIG. 1 is a schematic diagram of an automatic retransmission request using HARQ bundling. A BS respectively transmits transport blocks TB1, TB2, and TB3 in DL subframes 101, 102, and 103. If an error occurs in the transmission of the TB1 but the transmission of the TB2 and the TB3 is correct, a user equipment (UE) sends a HARQ NACK in an UL subframe 104, causing the BS to use DL subframes 105, 106, and 107 to retransmit the TB1, the TB2, and the TB3, but the retransmission of the TB2 and the TB3 is unnecessary.

SUMMARY OF THE INVENTION

In view of the above, the invention provides a BS and an automatic retransmission scheduling method thereof, so that a status report of a first retransmission mechanism of a first protocol layer assists in retransmission scheduling of a second retransmission mechanism of a second protocol layer, thereby reducing a waste of radio resources.

According to an embodiment of the invention, the automatic retransmission scheduling method is applied to a BS. The automatic retransmission scheduling method includes but is not limited to the following steps: when at least one first layer of protocol data unit (PDU) of a first protocol layer constitutes a second layer PDU of a second protocol layer, assigning a retransmission serial number of the second layer PDU according to a serial number of the first layer PDU; sending the second layer PDU to a UE; receiving a status report of a first retransmission mechanism, where the status report includes an ACK serial number, and the ACK serial number is used to indicate that receiving of a plurality of PDUs of the first protocol layer by the UE is acknowledged; and comparing the retransmission serial number of the second layer PDU with the ACK serial number, and determining, according to a comparison result, whether to disable retransmission of the second layer PDU based on a second retransmission mechanism.

According to an embodiment of the invention, the BS includes but is not limited to a receiving circuit, a transmitting circuit, and a processing circuit. The receiving circuit receives a signal. The transmitting circuit sends a signal. The processing circuit is coupled to the receiving circuit and the transmitting circuit and is configured to perform the following steps: when at least one first layer of protocol data unit (PDU) of a first protocol layer constitutes a second layer PDU of a second protocol layer, assigning a retransmission serial number of the second layer PDU according to a serial number of the first layer PDU; sending the second layer PDU to a UE by using the transmitting circuit; receiving a status report of a first retransmission mechanism by using the receiving circuit, where the status report includes an ACK serial number, and the ACK serial number is used to indicate that receiving of a plurality of PDUs of the first protocol layer by the UE is acknowledged; and comparing the retransmission serial number of the second layer PDU with the ACK serial number, and determining, according to a comparison result, whether to disable retransmission of the second layer PDU based on a second retransmission mechanism.

Based on the above, according to the BS and the automatic retransmission scheduling method thereof in the embodiments of the invention, the second layer PDU has the corresponding retransmission serial number according to the included serial number of the first layer PDU. In addition, the ACK serial number in the status report of the first retransmission mechanism may be used to indicate whether transmission of a PDU of the first protocol layer is correct. Based on this, the retransmission serial number of the second layer PDU is compared with the ACK serial number in the status report, to further determine whether retransmission of the second layer PDU based on the second retransmission mechanism is necessary, thereby reducing unnecessary retransmission.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Exemplary embodiments of the invention are described in detail, and examples of the exemplary embodiments are shown in the accompanying drawings. Whenever possible, the same component symbols are used in the drawings and descriptions to indicate the same or similar parts.

Figure 2:
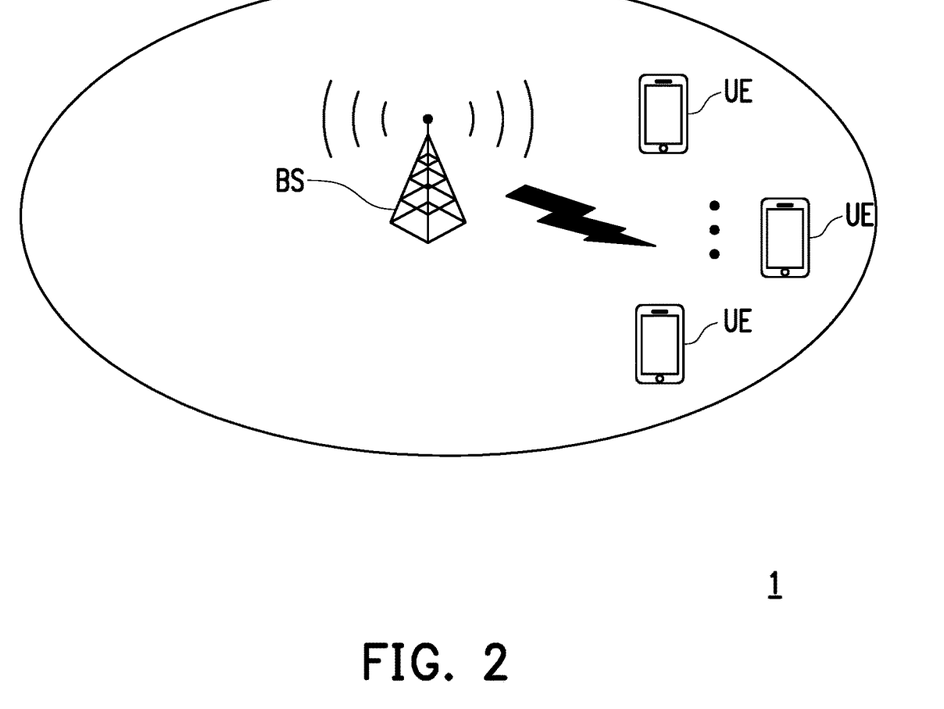
FIG. 2 is a schematic diagram of a communications system according to an embodiment of the invention.

FIG. 2 is a schematic diagram of a communications system according to an embodiment of the invention. Referring to FIG. 2, a communications system 2 includes but is not limited to at least a BS and one or more UEs.

The BS is, for example, (but is not limited to) a home evolved NodeB (HeNB), an eNB, a next-generation NodeB (gNB), an advanced base station (ABS), a base transceiver system (BTS), a relay, a repeater, and/or a satellite-based communication BS.

Figure 3:
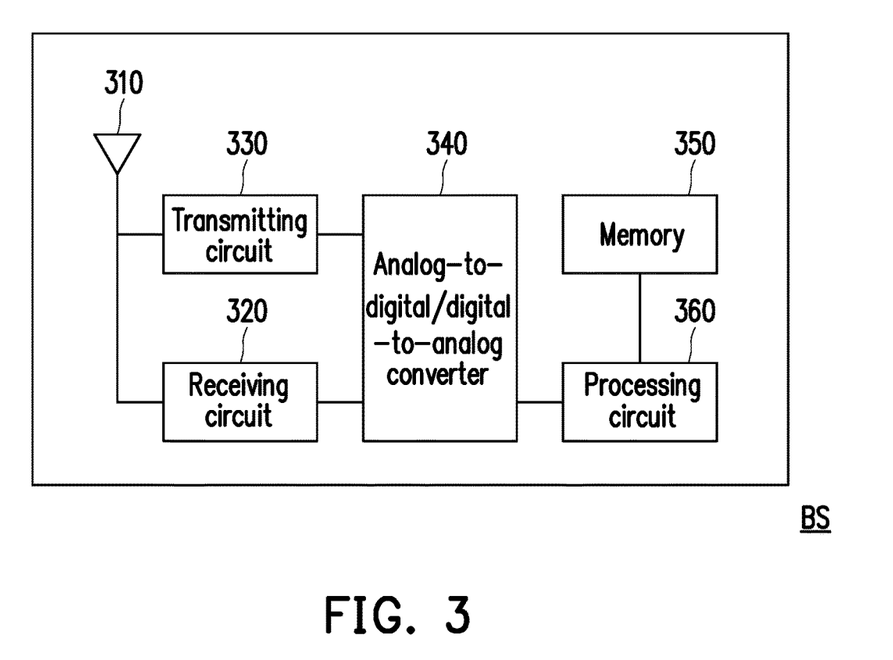
FIG. 3 is a component block diagram of a BS according to an embodiment of the invention.

FIG. 3 is a component block diagram of a BS according to an embodiment of the invention. The BS may include at least (but is not limited to) one or more antennas 310, a receiving circuit 320, a transmitting circuit 330, an analog-to-digital (A-to-D)/digital-to-analog (D-to-A) converter 340, a memory 350, and a processing circuit 360.

The receiving circuit 320 and the transmitting circuit 330 are respectively configured to wirelessly receive an uplink signal and transmit a downlink signal by using the antenna 310. The receiving circuit 320 and the transmitting circuit 330 may also perform analog signal processing operations such as low noise amplification, impedance matching, frequency mixing, up-conversion or down-conversion, filtering, and amplification. The A-to-D/D-to-A converter 340 is configured to perform A-to-D conversion for uplink and D-to-A conversion for downlink.

The memory 350 is, for example, (but is not limited to) a random access memory (RAM), a read-only memory (ROM), a flash memory, or a similar component or a combination of the foregoing components. The memory 350 records program code, device configuration, a codebook, and buffered or permanent data, and records other various communication protocol-related software modules such as a radio resource control layer, a MAC layer, and a physical layer.

The processing circuit 360 is configured to process a digital signal and execute a program according to an exemplary embodiment of the invention, and may access or load data and software modules recorded in the memory 350. The processing circuit 360 may be implemented by, for example, a central processing unit (CPU), a microprocessor, a microcontroller, a digital signal processing (DSP) chip, a field programmable gate array (FPGA), and other programmable units. The processing circuit 360 may also be implemented by an independent electronic device or an integrated circuit (IC), and operations of the processing circuit 360 may also be implemented through software.

The UE may include, for example, (but is not limited to) a mobile station, an advanced mobile station (AMS), a telephone device, a customer premise equipment (CPE), and a wireless sensor.

Figure 4:
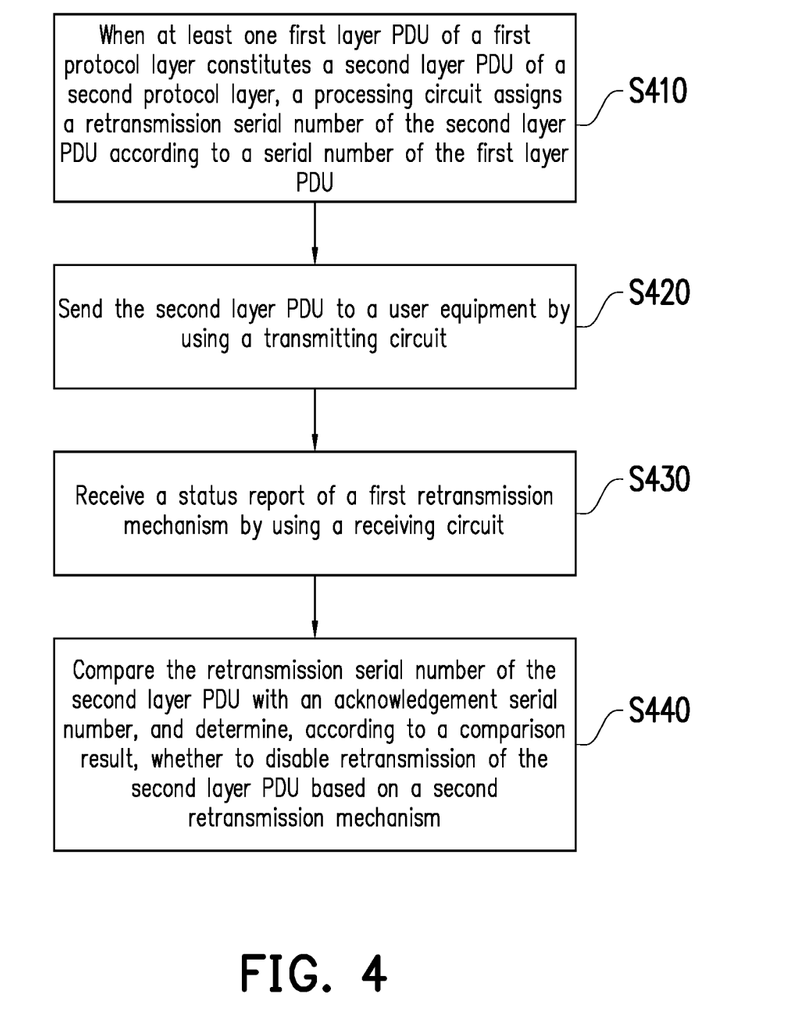
FIG. 4 is a flowchart of an automatic retransmission scheduling method according to an embodiment of the invention.

FIG. 4 is a flowchart of an automatic retransmission scheduling method according to an embodiment of the invention. Referring to FIG. 3 and FIG. 4, the method in the present embodiment is applied to the BS in the foregoing embodiment, and the following gives description based on each component of the BS.

In step S410, when at least one first layer protocol data unit (PDU) of a first protocol layer constitutes a second layer PDU of a second protocol layer, the processing circuit 360 assigns a retransmission serial number of the second layer PDU according to a serial number of the first layer PDU. In particular, the processing circuit 360 may implement operations and functions of a plurality of protocol layers by executing a plurality of software modules in the memory 350. The first protocol layer of the BS encapsulates a plurality of first layer service data units (SDU) into the first layer PDU and delivers the first layer PDU to the second protocol layer of the BS. The second protocol layer of the BS generates the second layer PDU by using the first layer PDU as a second layer SDU. In addition, when the first protocol layer of the BS generates the first layer PDU, the first protocol layer adds the serial number to a header of the first layer PDU. In other words, a header of each first layer PDU includes a corresponding serial number, so that a UE can sort received first layer PDUs. In addition, the serial number in the header of each first layer PDU is also applied to a first retransmission mechanism of the first protocol layer, so that the BS can learn which first layer PDUs need to be retransmitted.

It should be noted that the second layer PDU may include one or more first layer PDUs, and the processing circuit 360 assigns a serial number of one of the first layer PDUs (for example, a latest first layer PDU) as the retransmission serial number of the second layer PDU. In other words, the second layer PDU has the corresponding retransmission serial number according to the internally carried serial number of the first layer PDU. The first protocol layer or the second protocol layer may assign the retransmission serial number to the second layer PDU. For example, the first protocol layer may deliver a serial number of one of first layer PDUs constituting the second layer PDU to the second protocol layer, or the second protocol layer may parse a serial number of one of first layer PDUs from the second layer SDU, thereby generating the retransmission serial number of the second layer PDU.

In step S420, the processing circuit 360 sends the second layer PDU to the UE by using the transmitting circuit 330. The processing circuit 360 may transmit the second layer PDU to a next-layer protocol layer, so as to send the second layer PDU to the UE by using radio resources.

In step S430, the processing circuit 360 receives a status report of a first retransmission mechanism of the first protocol layer by using the receiving circuit 320. In particular, the first protocol layer is responsible for the first retransmission mechanism, and the first retransmission mechanism is used to reflect a reception status of a PDU of the first protocol layer sent by the BS. The status report may include an ACK serial number (ACK_Sn), and the ACK serial number is used to indicate receiving of which PDUs of the first protocol layer by the UE is acknowledged. In an embodiment, if the first protocol layer assigns serial numbers to PDUs in ascending order (that is, from a small serial number to a large serial number), the ACK serial number is used to indicate that receiving of each PDU whose serial number is less than the ACK serial number by the UE is acknowledged.

In step S440, the processing circuit 360 compares the retransmission serial number of the second layer PDU with the ACK serial number, and determines, according to a comparison result, whether to disable retransmission of the second layer PDU based on a second retransmission mechanism. In an embodiment of the invention, the second protocol layer of the BS is responsible for the second retransmission mechanism of the second layer PDU. In an embodiment, the second protocol layer of the BS may independently parse the ACK serial number from the status report, or the first protocol layer of the BS obtains the ACK serial number and sends the ACK serial number to the second protocol layer. Because the ACK serial number may indicate a reception status of a first layer PDU and the retransmission serial number is a serial number of a first layer PDU in the second layer PDU, the second protocol layer of the BS may determine, according to the retransmission serial number and the ACK serial number, whether receiving of the second layer PDU by the UE is acknowledged, to determine whether to disable retransmission based on the second retransmission mechanism.

In an embodiment, in response to receiving the status report of the first retransmission mechanism, the processing circuit 360 determines whether a retransmission process exists in a retransmission queue. In response to determining that the retransmission process exists in the retransmission queue, the processing circuit 360 compares a retransmission serial number corresponding to the retransmission process with the ACK serial number, to determine, according to the retransmission serial number and the ACK serial number, whether to disable retransmission based on the second retransmission mechanism.

In an embodiment, in response to receiving negative feedback of the second retransmission mechanism, the processing circuit 360 compares a retransmission serial number associated with the negative feedback with the ACK serial number, to determine whether to disable retransmission based on the second retransmission mechanism.

In an embodiment, the processing circuit 360 determines, through comparison, whether the retransmission serial number is less than the ACK serial number, where the serial number of the first layer PDU is assigned in ascending order. In response to determining that the retransmission serial number is less than the ACK serial number, the processing circuit 360 disables retransmission of the second layer PDU based on the second retransmission mechanism.

In an embodiment, the status report further includes at least one NACK serial number (NACK_Sn). The processing circuit 360 compares the retransmission serial number of the second layer PDU with the NACK serial number. In response to a fact that the retransmission serial number is different from the NACK serial number, the processing circuit 360 disables retransmission of the second layer PDU based on the second retransmission mechanism.

The following uses the LTE standard specified by 3GPP as an example for description. However, the invention is not limited thereto, and the invention is also applicable to 5G or a next-generation mobile communication standard. In an embodiment, the first protocol layer may be an RLC layer in the LTE standard, the second protocol layer may be a MAC layer in the LTE standard, the first retransmission mechanism may be an ARQ mechanism that the RLC layer is responsible for, and the second retransmission mechanism may be a HARQ mechanism that the MAC layer is responsible for.

Figure 5:
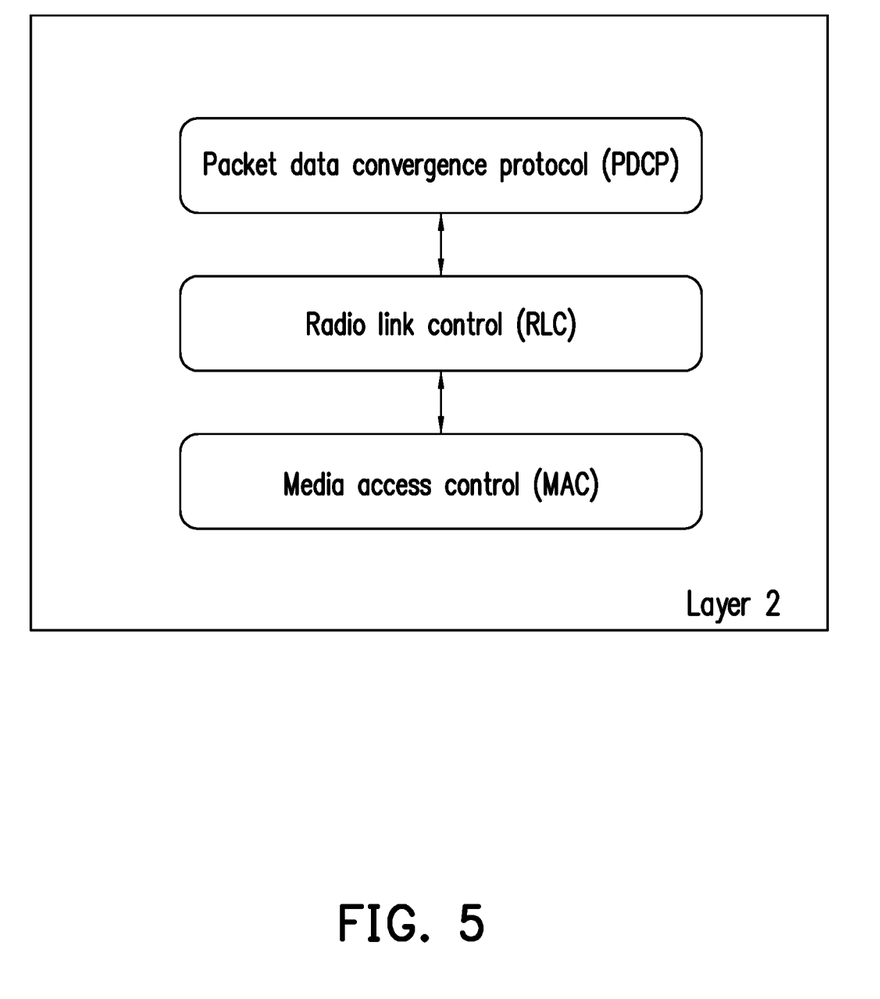
FIG. 5 is a schematic diagram of a plurality of protocol layers of a BS according to an embodiment of the invention.

FIG. 5 is a schematic diagram of a plurality of layers of a BS according to an embodiment of the invention. Referring to FIG. 5, a second layer of a communication protocol may include three sublayers: a MAC layer, an RLC layer, and a packet data convergence protocol (PDCP) layer. Data is correspondingly encapsulated at each sublayer. Data received by the sublayer from an upper layer is considered as an SDU of the sublayer, and the SDU becomes a PDU after being encapsulated by the sublayer.

In an embodiment, the processing circuit 360 of the BS may implement functions of the MAC layer and the RLC layer by executing software modules in the memory 350.

Figure 6:
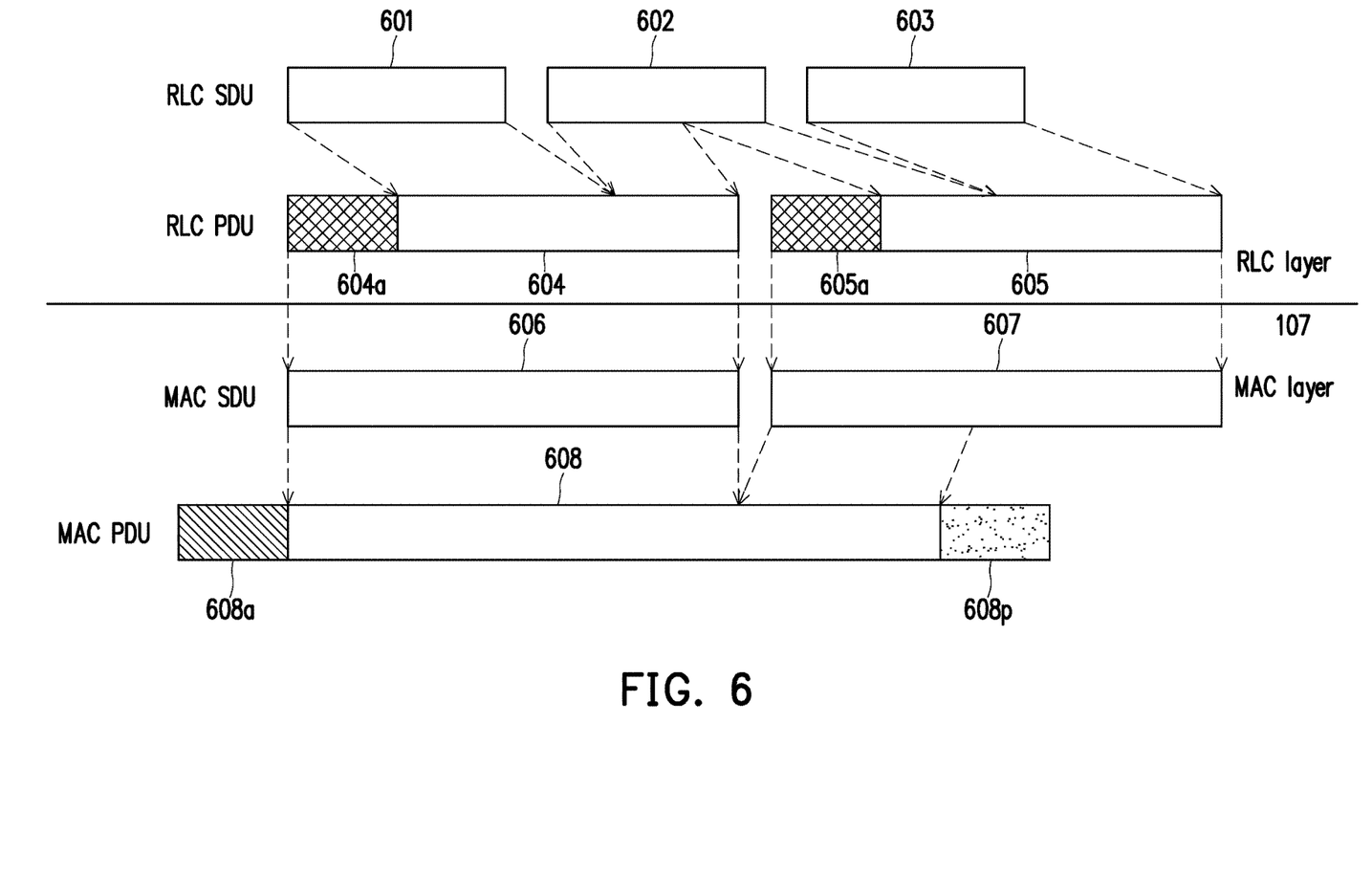
FIG. 6 is a schematic diagram of generating a MAC PDU according to an embodiment of the invention.

FIG. 6 is an exemplary schematic diagram of generating a MAC PDU according to an embodiment. An RLC layer obtains a plurality of RLC SDUs 601 to 603 from a PDCP layer, performs segmentation and assembling on the RLC SDUs 601 to 603, and adds headers 604a and 605a to generate RLC PDUs 604 and 605. Then, a MAC layer receives the RLC PDUs 604 and 605 from the RLC layer as MAC SDUs 606 and 607, performs segmentation and assembling on the MAC SDUs 606 and 607, and adds a MAC header 608a and MAC padding data 608p to generate a MAC PDU 608. Afterwards, a physical layer schedules the MAC PDU 608 provided by the MAC layer as a transport block (TB) for transmission in a subframe.

It should be noted that, in an embodiment, the RLC layer adds serial numbers respectively corresponding to the RLC PDUs 604 and 605 to the headers 604a and 605a. In this case, the header 604a includes a serial number 'Sn1' of the RLC PDU 604, and the header 605a includes a serial number 'Sn2' of the RLC PDU 605. If the RLC layer assigns the serial numbers to the RLC PDUs 604 and 605 in ascending order, because a generation time of the RLC PDU 604 is earlier than a generation time of the RLC PDU 605, the serial number 'Sn2' is greater than the serial number 'Sn1'. In an embodiment, the processing circuit 360 selects the serial number 'Sn2' of the latest generated PDU in the RLC PDUs 604 and 605 (that is, first layer PDUs) as a retransmission serial number of the MAC PDU 608 (that is, a second layer PDU). That is, the processing circuit 360 selects the serial number 'Sn2' of the RLC PDU 605 as the retransmission serial number of the MAC PDU 608.

Based on the above, because the retransmission serial number of the second layer PDU is the serial number of the latest generated PDU in the first layer PDUs, according to an ACK serial number in a status report of an ARQ mechanism and the retransmission serial number of the second layer PDU, the MAC layer can know whether receiving of a MAC PDU corresponding to a HARQ process in a retransmission queue by a UE is acknowledged. For example, if the retransmission serial number of the MAC PDU 608 is '101', that is, the serial number 'Sn2' of the RLC PDU 605 is '101', and the MAC layer of the BS receives a status report including an ACK serial number '105', it indicates that each RLC PDU whose serial number is less than the ACK serial number is correctly transmitted to the UE. Therefore, receiving of the RLC PDUs 604 and 605 in the MAC PDU 608 by the UE is acknowledged, and it further indicates that retransmission of the MAC PDU 608 is unnecessary. Therefore, the processing circuit may move a HARQ process corresponding to the MAC PDU 608 to an idle queue to release the HARQ process corresponding to the MAC PDU 608.

It should be noted that, in an embodiment, the processing circuit 360 may determine, based on the status report, whether a MAC PDU is correctly transmitted, to eliminate unnecessary retransmission before a NACK of a HARQ mechanism is received. Therefore, in an embodiment, the processing circuit 360 of the BS may control the user UE to refrain from starting of a status report prohibition timer (t_StatusProhibit) to not delay sending of the status report. In addition, the processing circuit 360 of the BS may set polling fields of all MAC PDUs to a bit value (for example, '1') used to request the status report, and request the UE to reply the status report. Based on the above, in an embodiment, the processing circuit 360 may receive a latest status report in each uplink subframe. Therefore, early transmission of the status report of the ARQ mechanism can effectively reduce unnecessary HARQ retransmission.

Figure 7:
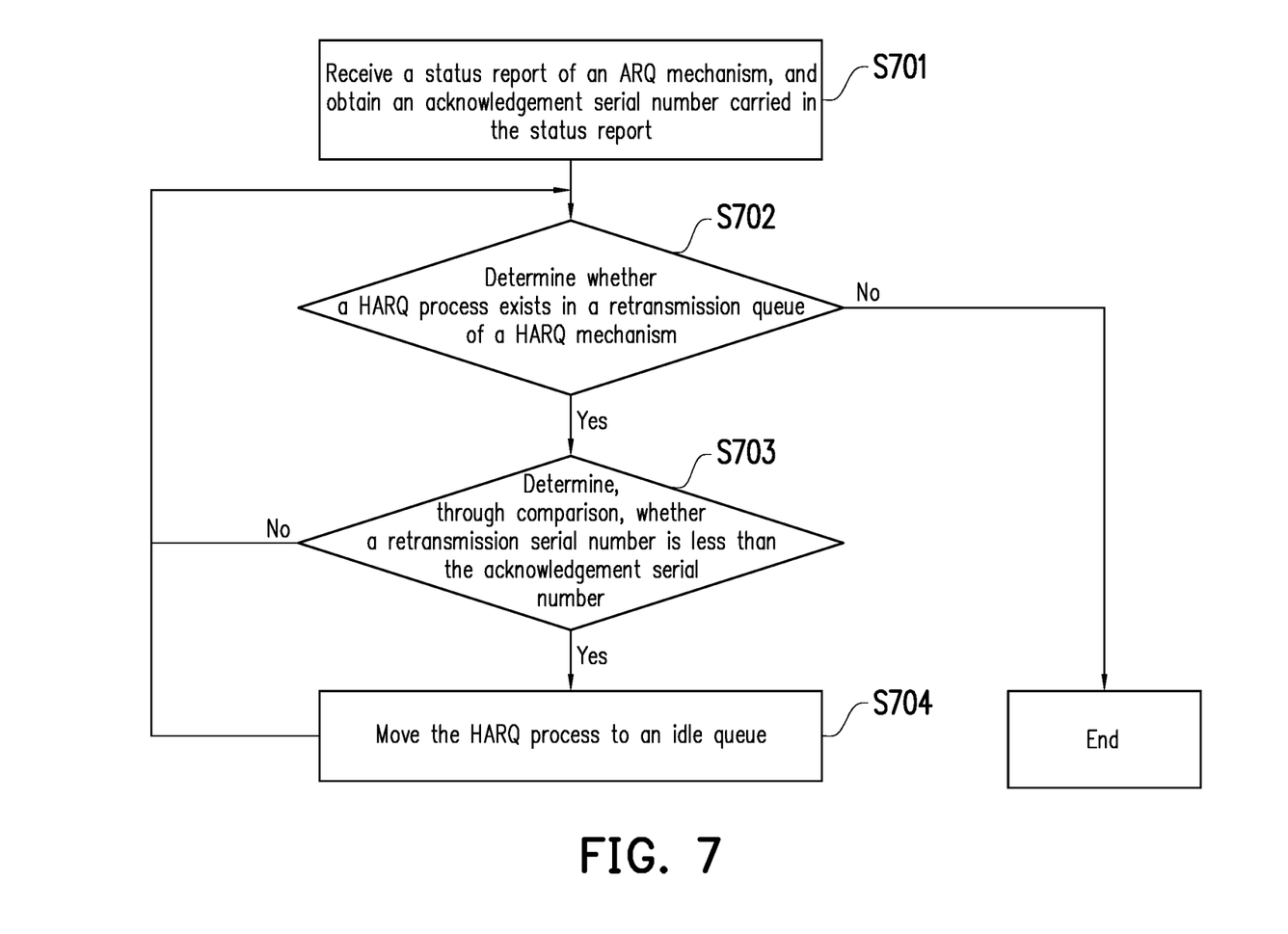
FIG. 7 is a flowchart of an automatic retransmission scheduling method according to an embodiment of the invention.

FIG. 7 is a flowchart of an automatic retransmission scheduling method according to an embodiment. Referring to FIG. 3 and FIG. 7, the method in the present embodiment is applied to the BS in the foregoing embodiment, and the following gives description based on each component of the BS.

In step S701, the processing circuit 360 receives a status report of an ARQ mechanism in an uplink subframe, and obtains an ACK serial number carried in the status report. In step S702, the processing circuit 360 determines whether a HARQ process exists in a retransmission queue of a HARQ mechanism. In other words, the processing circuit 360 determines whether the HARQ process exists in the retransmission queue, one HARQ process corresponding to transmission of one MAC PDU. It can be learned that one HARQ process also corresponds to a retransmission serial number of one MAC PDU. If it is determined in S702 that the HARQ process does not exist in the retransmission queue, it indicates that no retransmission process is currently in progress, and the processing circuit 360 performs no operation and the procedure ends. After the procedure ends, the processing circuit 360 may execute the procedure in FIG. 7 again in response to receiving a next status report in a next uplink subframe.

In response to determining that the HARQ process exists in the retransmission queue of the HARQ mechanism, the processing circuit 360 compares a retransmission serial number of a MAC PDU corresponding to the HARQ process with the ACK serial number, to determine, according to the retransmission serial number and the ACK serial number, whether to disable retransmission of the MAC PDU based on the HARQ mechanism. In the embodiment in FIG. 7, in a scenario in which serial numbers of RLC PDUs are assigned in ascending order, in response to determining that the retransmission serial number is less than the ACK serial number, in step S704, the processing circuit 360 moves the HARQ process to an idle queue and disables retransmission of the MAC PDU based on the HARQ mechanism. In particular, in response to determining to disable retransmission of the MAC PDU based on the HARQ mechanism, the processing circuit 360 may move, to the idle queue, the HARQ process that does not need to be retransmitted, to release the HARQ process.

In addition, in response to determining that the retransmission number is not less than the ACK serial number, the processing circuit 360 goes back to step S702. In addition, after retransmission of the MAC PDU is disabled in step S704, the processing circuit 360 also goes back to step S702. Therefore, the processing circuit 360 traverses all HARQ processes in the retransmission queue to check each HARQ process in the retransmission queue. Based on the procedure in FIG. 7, in response to receiving the status report of the ARQ mechanism, the BS may check whether retransmission of the MAC PDU corresponding to the HARQ process in the retransmission queue is necessary.

It should be noted that the present embodiment of the invention is not limited to the implementation of step S703. In other scenarios in which serial numbers of RLC PDUs are assigned in other specific orders (such as in descending order), the processing circuit 360 may determine, according to whether the retransmission serial number and the ACK serial number meet other comparison conditions, whether to disable retransmission of the MAC PDU based on the HARQ mechanism.

Figure 8:
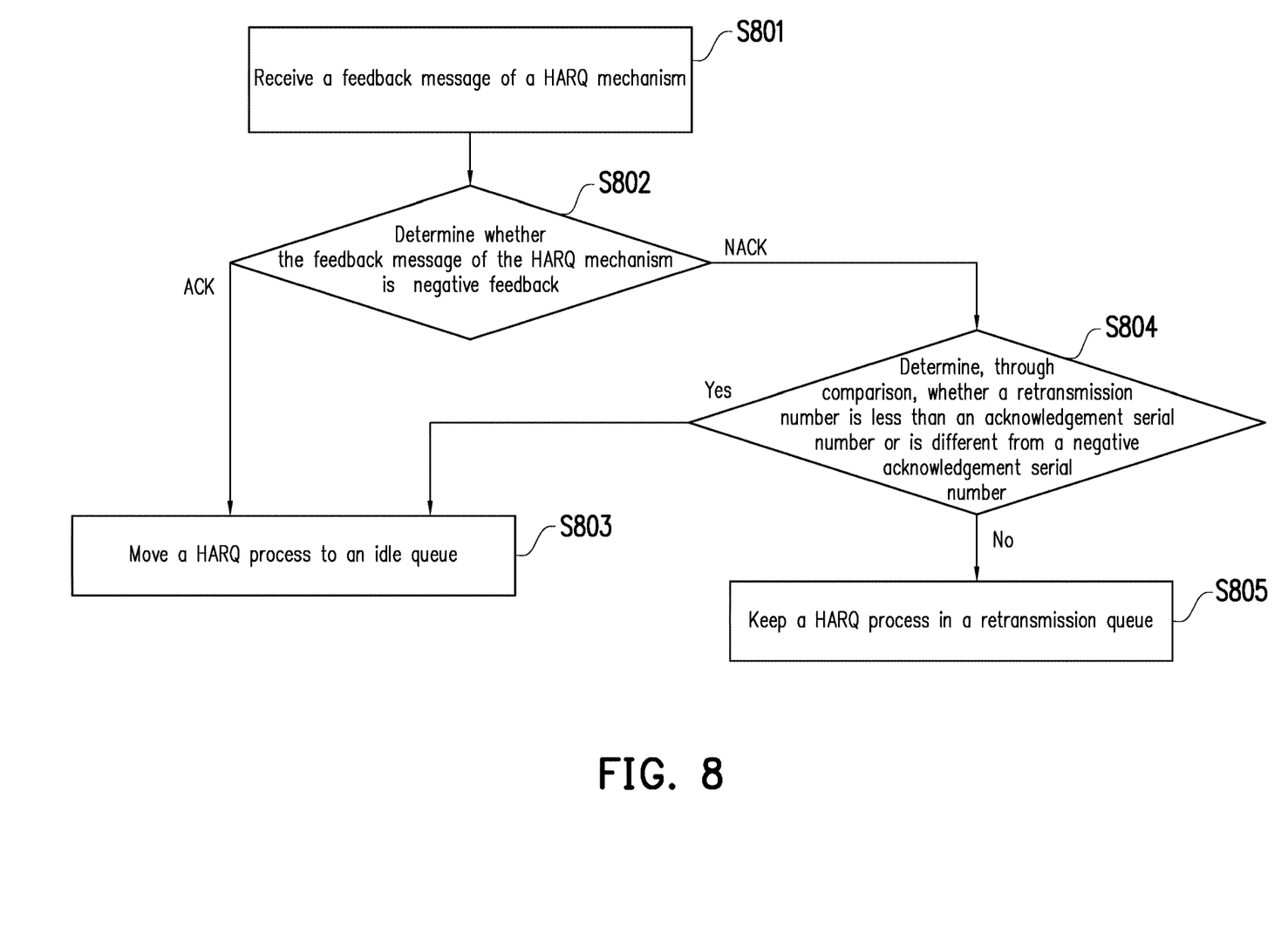
FIG. 8 is a flowchart of an automatic retransmission scheduling method according to an embodiment of the invention.

FIG. 8 is a flowchart of an automatic retransmission scheduling method according to an embodiment. Referring to FIG. 3 and FIG. 8, the method in the present embodiment is applied to the BS in the foregoing embodiment, and the following gives description based on each component of the BS.

In step S801, the processing circuit 360 receives a feedback message of a HARQ mechanism by using the receiving circuit 320. In step S802, the processing circuit 360 determines whether the feedback message of the HARQ mechanism is negative feedback (NACK). In response to receiving ACK feedback (ACK) of the HARQ mechanism by using the receiving circuit 320, the processing circuit 360 moves a HARQ process associated with the ACK to an idle queue in step S803.

In addition, in response to receiving a NACK of the HARQ mechanism by using the receiving circuit 320, the processing circuit 360 compares a retransmission serial number of a HARQ process associated with the HARQ NACK with an ACK serial number, to determine whether to disable retransmission of a MAC PDU based on the HARQ mechanism. In the embodiment in FIG. 8, serial numbers of RLC PDUs are assigned in ascending order. Accordingly, in response to receiving the HARQ NACK by using the receiving circuit 320, in step S804, the processing circuit 360 determines, through comparison, whether the retransmission serial number of the HARQ process associated with the HARQ NACK is less than the ACK serial number.

It should be noted that, in an embodiment, a status report of an ARQ mechanism may further include at least one NACK serial number (NACK_Sn), and the NACK serial number is used to indicate an RLC PDU that is not correctly transmitted. Therefore, in response to receiving the NACK of the HARQ mechanism by using the receiving circuit 320, in step S804, the processing circuit 360 may further compare the retransmission serial number of the HARQ process associated with the HARQ NACK with the NACK serial number.

In response to determining that the retransmission number of the HARQ process associated with the HARQ NACK is less than the ACK serial number or is different from the NACK serial number, in step S803, the processing circuit 360 moves the HARQ process associated with the HARQ NACK from a retransmission queue to the idle queue and disables retransmission of the MAC PDU based on the HARQ mechanism. In contrast, in response to determining that the retransmission serial number is not less than the ACK serial number or is the same as the NACK serial number, the processing circuit 360 keeps the HARQ process associated with the HARQ NACK in the retransmission queue in step S805. In other words, when it is determined, based on the retransmission serial number of the MAC PDU, that retransmission of the MAC PDU based on the HARQ mechanism cannot be disabled, the processing circuit 360 keeps the HARQ process in the retransmission queue.

Taking FIG. 1 as an example, it is assumed that a transmission error occurs in the TB1 transmitted in a DL subframe 101. In the present embodiment of the invention, the BS may determine, based on a status report of a first retransmission mechanism, whether the TB1, a TB2, and a TB3 are correctly received by a UE. Therefore, even if the BS receives a NACK of a second retransmission mechanism in an UL subframe 104, the BS does not need to retransmit the TB2 and the TB3 that are correctly transmitted. In comparison with a conventional method in which the TB1, the TB2, and the TB3 need to be retransmitted together, the present embodiment of the invention can avoid wasting two DL subframes 106 and 107 for unnecessary retransmission.

In view of the above, according to the BS and the automatic retransmission scheduling method thereof in the embodiments of the invention, the second layer PDU corresponds to the retransmission serial number according to the serial number of the first layer PDU, the retransmission process responsible for the second layer PDU in the second retransmission mechanism has the corresponding retransmission serial number, and the ACK serial number and the NACK serial number in the status report of the first retransmission mechanism may be used to indicate whether transmission of a PDU of the first protocol layer is successful. Accordingly, in response to receiving the status report of the first retransmission mechanism or the negative feedback of the second retransmission mechanism, in the embodiments of the invention, the retransmission serial number of the second layer PDU in the retransmission queue is compared with the ACK serial number or the NACK serial number in the status report, and it is determined, according to the comparison result, to retain the retransmission process in the retransmission queue or move the retransmission process to the idle queue. Based on the above, the status report of the first retransmission mechanism assists in retransmission scheduling of the second retransmission mechanism, so that unnecessary retransmission in the second retransmission mechanism can be reduced, to avoid wasting downlink subframe resources on unnecessary retransmission. In this way, transmission efficiency can be improved through effective utilization of radio resources.

Finally, it should be noted that the above embodiments are merely intended for describing the technical solutions of the invention rather than limiting the invention. Although the invention is described in detail with reference to the foregoing embodiments, those of ordinary skill in the art should understand that they can still make modifications to the technical solutions described in the foregoing embodiments or make equivalent substitutions to some technical features thereof, without departing from scope of the technical solutions of the embodiments of the invention.

What is claimed is:

1. An automatic retransmission scheduling method, adapted to a base station (BS), comprising:
   when at least one first layer protocol data unit (PDU) of a first protocol layer constitutes a second layer PDU of a second protocol layer, assigning a retransmission serial number of the second layer PDU according to a serial number of the first layer PDU;
   sending the second layer PDU to a user equipment (UE);
   receiving a status report of a first retransmission mechanism of the first protocol layer, wherein the status report comprises an acknowledgement (ACK) serial number, and the ACK serial number is used to indicate that receiving of at least one PDU of the first protocol layer by the UE is acknowledged; and
   comparing the retransmission serial number of the second layer PDU with the ACK serial number, and determining, according to a comparison result, whether to disable retransmission of the second layer PDU based on a second retransmission mechanism.

2. The automatic retransmission scheduling method according to claim 1, wherein the first protocol layer is a radio link control (RLC) layer, the second protocol layer is a media access control (MAC) layer, the first retransmission mechanism is an automatic repeat request (ARQ), and the second retransmission mechanism is a hybrid automatic repeat request (HARD).

3. The automatic retransmission scheduling method according to claim 1, wherein the step of assigning the retransmission serial number of the second layer PDU according to the serial number of the first layer PDU comprises:
   selecting a serial number of a latest generated PDU from the first layer PDU as the retransmission serial number of the second layer PDU.

4. The automatic retransmission scheduling method according to claim 1, wherein the step of comparing the retransmission serial number of the second layer PDU with the ACK serial number, and determining, according to the comparison result, whether to disable retransmission of the second layer PDU based on the second retransmission mechanism comprises:
   determining whether a retransmission process exists in a retransmission queue; and
   in response to determining that the retransmission process exists in the retransmission queue, comparing a retransmission serial number corresponding to the retransmission process with the ACK serial number, to determine, according to the retransmission serial number and the ACK serial number, whether to disable retransmission of the second layer PDU based on the second retransmission mechanism.

5. The automatic retransmission scheduling method according to claim 1, wherein the step of comparing the retransmission serial number of the second layer PDU with the ACK serial number, and determining, according to the comparison result, whether to disable retransmission of the second layer PDU based on the second retransmission mechanism comprises:
   in response to receiving negative feedback of the second retransmission mechanism, comparing the retransmission serial number associated with the negative feedback with the ACK serial number, and determining whether to disable retransmission of the second layer PDU based on the second retransmission mechanism.

6. The automatic retransmission scheduling method according to claim 1, wherein the step of comparing the retransmission serial number of the second layer PDU with the ACK serial number, and determining, according to the comparison result, whether to disable retransmission of the second layer PDU based on the second retransmission mechanism comprises:
   determining, through comparison, whether the retransmission serial number is less than the ACK serial number, wherein the serial number of the first layer PDU is assigned in ascending order; and
   in response to determining that the retransmission serial number is less than the ACK serial number, disabling retransmission of the second layer PDU based on the second retransmission mechanism.

7. The automatic retransmission scheduling method according to claim 1, wherein the status report further comprises at least one negative acknowledgement (NACK) serial number, and the method further comprises:
  comparing the retransmission serial number of the second layer PDU with the NACK serial number; and
  in response to a fact that the retransmission serial number is different from the NACK serial number, disabling retransmission of the second layer PDU based on the second retransmission mechanism.

8. The automatic retransmission scheduling method according to claim 1, wherein the method further comprises:
  refraining from starting a status report prohibition timer of the UE; and
  setting polling fields of the second layer PDU and other second layer PDUs to request the status report.

9. A base station, comprising:
  a receiving circuit configured to receive a signal;
  a transmitting circuit configured to send a signal; and
  a processing circuit coupled to the receiving circuit and the transmitting circuit and configured to:
    when at least one first layer of protocol data unit (PDU) of a first protocol layer constitutes a second layer PDU of a second protocol layer, assign a retransmission serial number of the second layer PDU according to a serial number of the first layer PDU;
    send the second layer PDU to a user equipment (UE) by using the transmitting circuit;
    receive a status report of a first retransmission mechanism of the first protocol layer by using the receiving circuit, wherein the status report comprises an acknowledgement (ACK) serial number, and the ACK serial number is used to indicate that receiving of at least one PDU of the first protocol layer by the UE is acknowledged; and
    compare the retransmission serial number of the second layer PDU with the ACK serial number, and determine, according to a comparison result, whether to disable retransmission of the second layer PDU based on a second retransmission mechanism.

10. The base station according to claim 9, wherein the first protocol layer is a radio link control (RLC) layer, the second protocol layer is a media access control (MAC) layer, the first retransmission mechanism is an automatic repeat request (ARQ), and the second retransmission mechanism is a hybrid automatic repeat request (HARD).

11. The base station according to claim 9, wherein the processing circuit is configured to:
  select a serial number of a latest generated PDU from the first layer PDU as the retransmission serial number of the second layer PDU.

12. The base station according to claim 9, wherein the processing circuit is configured to:
  determine whether a retransmission process exists in a retransmission queue; and
  in response to determining that the retransmission process exists in the retransmission queue, compare a retransmission serial number corresponding to the retransmission process with the ACK serial number, to determine, according to the retransmission serial number and the ACK serial number, whether to disable retransmission of the second layer PDU based on the second retransmission mechanism.

13. The base station according to claim 9, wherein the processing circuit is configured to:
  in response to receiving negative feedback of the second retransmission mechanism by using the receiving circuit, compare the retransmission serial number associated with the negative feedback with the ACK serial number, to determine whether to disable retransmission of the second layer PDU based on the second retransmission mechanism.

14. The base station according to claim 9, wherein the processing circuit is configured to:
  determine, through comparison, whether the retransmission serial number is less than the ACK serial number, wherein the serial number of the first layer PDU is assigned in ascending order; and
  in response to determining that the retransmission serial number is less than the ACK serial number, disable retransmission of the second layer PDU based on the second retransmission mechanism.

15. The base station according to claim 9, wherein the status report further comprises at least one negative acknowledgement (NACK) serial number, and the processing circuit is configured to:
  compare the retransmission serial number of the second layer PDU with the NACK serial number; and
  in response to a fact that the retransmission serial number is different from the NACK serial number, disable retransmission of the second layer PDU based on the second retransmission mechanism.

16. The base station according to claim 9, wherein the processing circuit is configured to:
  refrain from starting a status report prohibition timer of the UE; and
  set polling fields of the second layer PDU and other second layer PDUs to a one-bit value used to request the status report.

* * * * *